United States Patent
Schroff et al.

(10) Patent No.: US 11,126,820 B2
(45) Date of Patent: Sep. 21, 2021

(54) GENERATING OBJECT EMBEDDINGS FROM IMAGES

(71) Applicant: Google LLC, Mountain View, CA (US)

(72) Inventors: Gerhard Florian Schroff, Santa Monica, CA (US); Dmitry Kalenichenko, Los Angeles, CA (US); Keren Ye, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 1 day.

(21) Appl. No.: 16/842,920

(22) Filed: Apr. 8, 2020

(65) Prior Publication Data

US 2020/0242333 A1 Jul. 30, 2020

Related U.S. Application Data

(63) Continuation of application No. 15/818,124, filed on Nov. 20, 2017, now Pat. No. 10,657,359.

(51) Int. Cl.
*G06K 9/00* (2006.01)
*G06N 3/04* (2006.01)
(Continued)

(52) U.S. Cl.
CPC ..... *G06K 9/00228* (2013.01); *G06K 9/00288* (2013.01); *G06K 9/00677* (2013.01); *G06K 9/4628* (2013.01); *G06K 9/4671* (2013.01); *G06K 9/6245* (2013.01); *G06K 9/6248* (2013.01); *G06K 9/6257* (2013.01); *G06K 9/6262* (2013.01); *G06K 9/6274* (2013.01); *G06N 3/0454* (2013.01); *G06N 3/084* (2013.01)

(58) Field of Classification Search
CPC ........... G06K 9/00228; G06K 9/00288; G06K 9/00677; G06K 9/4628; G06K 9/4671; G06K 9/6274; G06K 9/6245; G06K 9/6248; G06K 9/6262; G06K 9/6257; G06N 3/0454; G06N 3/084
USPC ......................................... 382/118, 159, 278
See application file for complete search history.

(56) References Cited

U.S. PATENT DOCUMENTS 9,836,641 B2   12/2017   Philbin
2017/0287137 A1   10/2017   Lin et al.
(Continued)

FOREIGN PATENT DOCUMENTS

CN   106687989   5/2017
CN   107077625   8/2017

OTHER PUBLICATIONS

CN Office Action in Chinese Application No. 201880069917.3, dated Dec. 25, 2020, 10 pages (with English translation).
(Continued)

*Primary Examiner* — Daniel G Mariam
(74) *Attorney, Agent, or Firm* — Fish & Richardson P.C.

(57) ABSTRACT

Methods, systems, and apparatus, including computer programs encoded on a computer storage medium, for training an object embedding system. In one aspect, a method comprises providing selected images as input to the object embedding system and generating corresponding embeddings, wherein the object embedding system comprises a thumbnailing neural network and an embedding neural network. The method further comprises backpropagating gradients based on a loss function to reduce the distance between embeddings for same instances of objects, and to increase the distance between embeddings for different instances of objects.

20 Claims, 3 Drawing Sheets

(51) Int. Cl.
*G06N 3/08* (2006.01)
*G06K 9/46* (2006.01)
*G06K 9/62* (2006.01)

(56) References Cited

U.S. PATENT DOCUMENTS

2017/0300783 A1 10/2017 Kumar et al.
2019/0156106 A1 5/2019 Schroff

OTHER PUBLICATIONS

PCT International Preliminary Report in International Application No. PCT/US2018/058644, dated May 26, 2020, 13 pages.
Belanger et al. "Synthesizing normalized faces from facial identity features," Proceedings of the IEEE Conference on Computer Vision and Pattern Recognition, Jul. 2017, 10 pages.
Esteves et al. "Polar Transformer Networks," arXiv 1709.01889v2, Oct. 27, 2017, 13 pages.
Girshick. "Fast r-cnn," Proceedings of the IEEE International Conference on Computer Vision, 2015, 9 pages.
Hinton et al. "Distilling the knowledge in a neural network," arXiv 1503.02531, Mar. 9, 2015, 9 pages.
Howard et al. "MobileNets: Efficient convolutional neural networks for mobile vision applications," arXiv 1704.04861, Apr. 17, 2017, 9 pages.
Huang et al. "Speed/accuracy trade-offs for modern convolutional object detectors," arXiv 1611.10012v3, Apr. 25, 2017, 21 pages.
Jaderberg et al. "Spatial Transformer networks," Advances in Neural Information Processing Systems, 2015, 9 pages.
Johnson et al. "Densecap: Fully convolutional localization networks for dense captioning," Proceedings of the IEEE Conference on Computer Vision and Pattern Recognition, 2016, 10 pages.
Li et al. "Dense Transformer Networks," arXiv 1705.08881v2, Jun. 8, 2017, 10 pages.
Lin et al. "Inverse Compositional Spatial Transformer Networks," arXiv 1612.03897v1 Dec. 12, 2015, 9 pages.
Liu et al. "Deepfashion: Powering robust clothes recognition and retrieval with rich annotations," Proceedings of the IEEE Conference on Computer Vision and Pattern Recognition, 2016, 9 pages.
Liu et al. "Ssd: Single shot multibox detector," European conference on computer vision, European Conference on Computer Vision, Oct. 8, 2016, 17 pages.
PCT International Search Report and Written Opinion issued in International Application No. PCT/US2018/058644, dated Feb. 14, 2019, 20 pages.
PCT International Written Opinion in International Application No. PCT/US2018/058644, dated Nov. 4, 2019, 10 pages.
Redmon et al. "You only look once: Unified, real-time object detection," Proceedings of the IEEE Conference on Computer Vision and Pattern Recognition, 2016, 10 pages.
Ren et al. "Faster r-cnn: Towards real-time object detection with region proposal networks," Advances in neural information processing systems, 2015, 9 pages.
Schroff et al. "Facenet: A unified embedding for face recognition and clustering," Proceedings of the IEEE Conference on Computer Vision and Pattern Recognition, 2015, 9 pages.
Singh et al. "End-to-end localization and ranking for relative attributes," European Conference on Computer Vision, Oct. 2016, 16 pages.
Viola et al. "Robust real-time face detection," International Journal of Computer Vision, 57(2), May 2004, 18 pages.
Wang et al. "Multi-label image recognition by recurrently discovering attentional regions," Nov. 8, 2017, 9 pages.
Zhong, et al. "Towards End-to-End Face Recognition through Alignment Learning", pp. 1-10.

GENERATING OBJECT EMBEDDINGS FROM IMAGES

CROSS REFERENCE TO RELATED APPLICATION

This application is a continuation application of U.S. application Ser. No. 15/818,124, filed Nov. 20, 2017, which is incorporated by reference.

BACKGROUND

This specification relates to processing images using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a method implemented as computer programs on one or more computers in one or more locations for training an object embedding system.

According to a first aspect there is provided a method for end-to-end training of an object embedding system, the method comprising: iteratively training an object embedding system on a plurality of images, each of the images depicting an object of a particular type, each iteration of the training comprising: providing selected images as input to the object embedding system and generating corresponding embeddings, wherein the object embedding system comprises a thumbnailing neural network and an embedding neural network, wherein each neural network comprises a plurality of consecutive layers that are exclusive of each other, and wherein generating an embedding for an object depicted in an image using the object embedding system comprises: generating a thumbnail representation of the object depicted in the image as output of the thumbnailing neural network, wherein the thumbnailing neural network processes an input in accordance with values of a set of thumbnailing neural network parameters to: determine values of parameters of a spatial transformation that defines a correspondence between pixels of the thumbnail representation and pixels of the image; and generate as output the thumbnail representation using the spatial transformation and the image; generating an embedding by providing the thumbnail representation as input to the embedding neural network that is configured to process the thumbnail representation in accordance with values of a set of embedding neural network parameters to generate an embedding as output; determining gradients based on a loss function to reduce a distance between embeddings for same instances of objects, and to increase the distance between embeddings for different instances of objects; and adjusting the values of the set of spatial transformer neural network parameters and the values of the set of embedding neural network parameters using the gradients.

In some implementations, the object embedding system additionally comprises a detection neural network comprising a plurality of consecutive layers, and generating an embedding for an object depicted in an image using the object embedding system additionally comprises: generating an encoded representation of the image by providing the image as input to the detection neural network, wherein the detection neural network is configured to process the image in accordance with values of a set of detection neural network parameters to generate an encoded representation of the image; and providing the encoded representation of the image as input to the thumbnailing neural network.

In some implementations, the detection neural network is pre-trained to generate encoded representations of images comprising data identifying predicted locations of objects of the particular type in the image.

In some implementations, the embedding neural network is pre-trained based on thumbnail representations of objects of the particular type that are not generated by the thumbnailing neural network.

In some implementations, determining gradients based on the loss function additionally comprises, for each selected image: determining positions of key points of the thumbnail representation generated by the thumbnailing neural network; determining positions of the key points of the thumbnail representation in a frame of reference of the image; and reducing an error measure between positions of key points of the object of the particular type depicted in the image and the positions of the key points of the thumbnail representation in the frame of reference of the image.

In some implementations, the key points of the object of the particular type depicted in the image comprise vertices of a bounding box around the object of the particular type depicted in the image, and wherein the key points of the thumbnail representation comprise bounding vertices of the thumbnail representation.

In some implementations, the error measure is a sum of errors between the positions of the key points of the object of the particular type depicted in the image and the positions of the key points of the thumbnail representation in the frame of reference of the image; and the error between a position of a key point of the object of the particular type depicted in the image and a corresponding position of a key point of the thumbnail representation in the frame of reference of the image is zero if a distance between them is less than a tolerance radius.

In some implementations, the tolerance radius is increased over the training iterations until it reaches a maximum threshold.

In some implementations, the spatial transformation of the thumbnailing neural network includes an image warping spatial transformation that defines a correspondence between the pixels of the thumbnail representation and the pixels of the image according to a displacement vector at each pixel of the thumbnail representation.

In some implementations, the spatial transformation of the thumbnailing neural network is a composition of an affine spatial transformation and the image warping spatial transformation.

In some implementations, the objects of the particular type are faces.

In some implementations, the method comprises: providing an image as input to an object embedding and receiving as output an embedding vector which is indicative of an object in the image.

In some implementations, the object embedding system is trained to generate embeddings of faces and wherein the object in the image is a face, the method further comprising: comparing the embedding vector to one or more reference embedding vectors, each associated with a different face, thereby to identify the face in the input image.

The above aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages. An object embedding system as described in this specification integrates processes for object detection, object thumbnailing, and object embedding into a single framework that can be jointly optimized by end-to-end training, unlike systems that employ multiple independent processes for object detection, object thumbnailing, and object embedding. The joint optimization of the object embedding system as described in this specification may result in the object embedding system generating superior object embeddings (e.g., object embeddings that are more useful for object identification) than systems that are not jointly optimized. For example, in some systems, object thumbnails are determined by extracting a fixed size bounding box from around a detected object in an image, and applying a fixed transformation to the thumbnail to align it in a standard frame of reference (e.g. by detecting and aligning features of the object). The object embedding system as described in this specification generates a thumbnail representation of an object according the output of a thumbnailing neural network that can determine cropping and warping parameters of the thumbnail representation that are specific to the object, and optimized to generate the most useful embedding of the object. This advantage is an improvement in the field of image processing and computer vision.

Training the object embedding system as described in this specification may consume fewer computational resources (e.g., memory and computing power) than training some other systems, since training the object embedding system as described in this specification obviates the need for parameter tuning associated with training some other systems. For example, in some other systems, the thumbnail representations of objects depicted in images are generated by extracting a bounding box of a fixed size from around the object depicted in the image. In these cases, the size of the bounding box may be determined by a parameter tuning process to test multiple different bounding box sizes. For the object embedding system as described in this specification, the thumbnail representations of objects, including the size of bounding box around the object, are automatically determined by a thumbnailing neural network. This advantage is another improvement in the field of image processing and computer vision.

The object embedding system as described in this specification may consume fewer computational resources in training (e.g., memory and computing power) than some other systems since the object embedding system may be trained based on a loss function that includes a term requiring the thumbnail representations of objects generated by the thumbnailing neural network to accurately localize objects in input images. Training the object embedding system based on this loss function may cause the parameters of the object embedding system to converge more quickly and to a more desirable local minimum during training (thereby consuming fewer computational resources) than if the object embedding system were trained based on a different loss function. This advantage is another improvement in the field of image processing and computer vision.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a method for end-to-end training of an object embedding system. The object embedding system receives as input an image depicting an object of a particular type (e.g., a human face) and processes the image to generate as output an embedding of the object (i.e., a numerical representation of the object). The system includes a thumbnailing neural network and an embedding neural network.

The thumbnailing neural network generates a thumbnail representation of the object depicted in the image by processing an input to determine values of parameters of a spatial transformation and applying the spatial transformation with the determined parameter values to the image. The spatial transformation may define a correspondence between pixels of the thumbnail representation and pixels of the image.

The embedding neural network processes the thumbnail representation of the object output by the thumbnailing neural network to generate as output an embedding of the object. A training engine trains the system to generate embeddings such that the distance between embeddings of same instances of objects (e.g., between embeddings for instances of a same face) is reduced, and such that the distance between embeddings of different instances of objects is increased (e.g., between embeddings for instances of different faces). In some implementations, the object embedding system includes a detection neural network that processes the image to generate an encoded representation of the image, and provides the encoded representation of the image as input to the thumbnailing neural network.

These features and additional features are described in more detail below.

Figure 1:
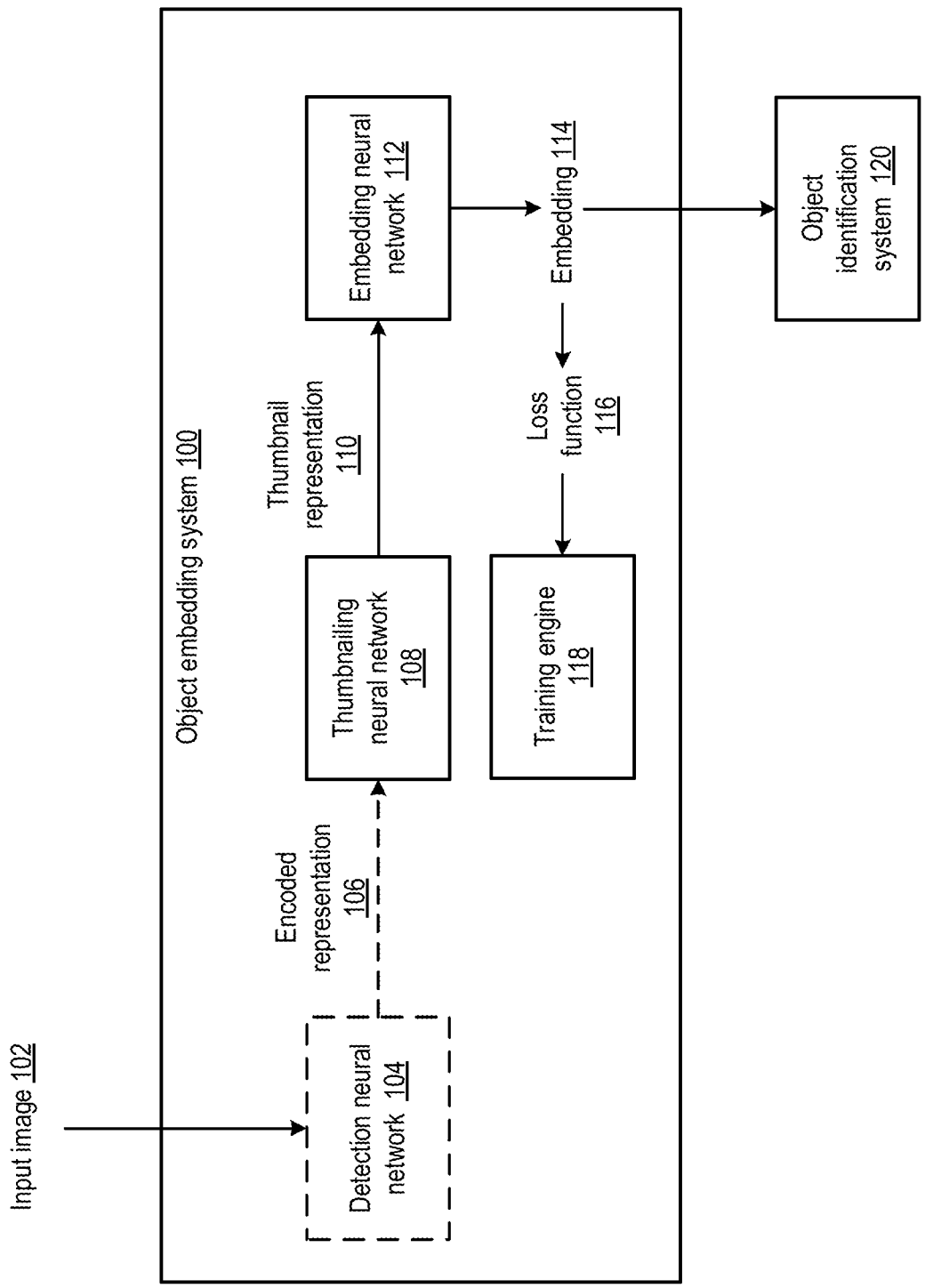
FIG. 1 is an illustration of an example object embedding system.

FIG. 1 is an illustration of an example object embedding system 100. The object embedding system 100 is an example of a system implemented as computer programs on one or more computers in one or more locations in which the systems, components, and techniques described below are implemented.

The system 100 is configured to receive an input image 102 depicting an object of a particular type and to process the input image 102 to generate as output an embedding 114 of the object (i.e., a numerical representation of the object in the form of an embedding vector). The particular type of the object may be, for example, human faces or full human bodies. Other object types may also be used. The training engine 118 jointly optimizes the parameters of the system 100 by backpropagating gradients based on the loss function 116.

The system 100 includes a thumbnailing neural network 108 that is configured to process an input in accordance with values of a set of thumbnailing neural network parameters to generate as output a corresponding thumbnail representation 110. The thumbnail representation 110 is an image that depicts the object from the input image 102. The thumbnailing neural network 108 generates the thumbnail representation 110 by determining parameters of a spatial transformation and applying the determined spatial transformation to the input image 102. The spatial transformation may specify a correspondence between each pixel of the thumbnail representation 110 and a corresponding pixel of the input image 102.

In some implementations, the thumbnailing neural network 108 is configured to process an encoded representation 106 of the input image 102 that is generated by a detection neural network 104 to determine the parameters of the spatial transformation to apply to the input image 102 to generate the thumbnail representation 110. The detection neural network 104 is configured to receive the input image 102 as input, and to process the input image 102 in accordance with values of a set of detection neural network parameters to generate as output an encoded representation 106 of the input image 102.

In some implementations, the detection neural network 104 is pre-trained. In this specification, pre-training a neural network refers to optimizing (in a relative sense) the values of the set of neural network parameters based on a pre-training loss function that may be different from the loss function 116 of the system 100 prior to using the neural network in the system 100. In some implementations, the detection neural network 104 is pre-trained to process images to generate encoded representations 106 of the images including data identifying predicted locations of objects of the particular type depicted in the images. Data identifying predicted locations of objects of the particular type may include, for example, the coordinates of bounding boxes and corresponding probabilities that the bounding boxes contain objects of the particular type. In these implementations, pre-training the detection neural network 104 may involve optimizing the values of the set of detection neural network parameters to cause the detection neural network 104 to generate more accurate predictions of the locations of objects of the particular type depicted in images, based on a set of images where the object locations are known.

The system 100 includes an embedding neural network 112 that is configured to receive a thumbnail representation 110, process the thumbnail representation 110 in accordance with values of a set of embedding neural network parameters, and generate as output an embedding 114 of the object depicted in the thumbnail representation 110. In some implementations, the embedding neural network 104 is pre-trained based on a set of thumbnail representations that are not generated by the thumbnailing neural network 108. For example, the set of thumbnail representations used to pre-train the embedding neural network 112 may be generated by manual annotation. In these implementations, the embedding neural network 104 may be pre-trained based on a loss function to reduce the distance between embeddings generated by the embedding neural network 112 of same instances of objects and to increase the distance between embeddings generated by the embedding neural network 112 of different instances of objects. For example, the embedding neural network 112 may be pre-trained based on a triplet loss function.

An input image 102 may depict one or more instances of objects of the particular type. In some implementations, the system 100 generates embeddings 114 for each object of the particular type depicted in the input image 102. In some other implementations, the system 100 generates an embedding 114 for only one object of the particular type depicted in the image 102. In cases where the input image 102 does not depict any instances of the object of the particular type, the system 100 may not produce an embedding 114.

The training engine 118 trains the system 100 by backpropagating gradients based on a loss function 116 to adjust the parameters of one or more of the embedding neural network 112, the thumbnailing neural network 108, and the detection neural network 104. In particular, the loss function 116 includes a term, referred to in this specification as a task loss term, to reduce a distance between embeddings generated by the system 100 for same instances of objects and to increase the distance between embeddings generated by the system 100 for different instances of objects. In some implementations, the loss function 116 includes an additional term, referred to in this specification as a localization term, enforcing that the thumbnailing neural network 108 accurately localizes objects in the input image, as will be described in more detail below. An example process for training an object embedding system is described with reference to FIG. 2.

Object embeddings generated by the system 100 can be provided to an object identification system 120 that determines the identities of objects based on their embeddings (e.g., as generated by the system 100). For example, the object identification system 120 may be a facial identification system that determines identities of faces based on face embeddings. An example process for identifying objects using an object identification system is described with reference to FIG. 3.

Figure 2:
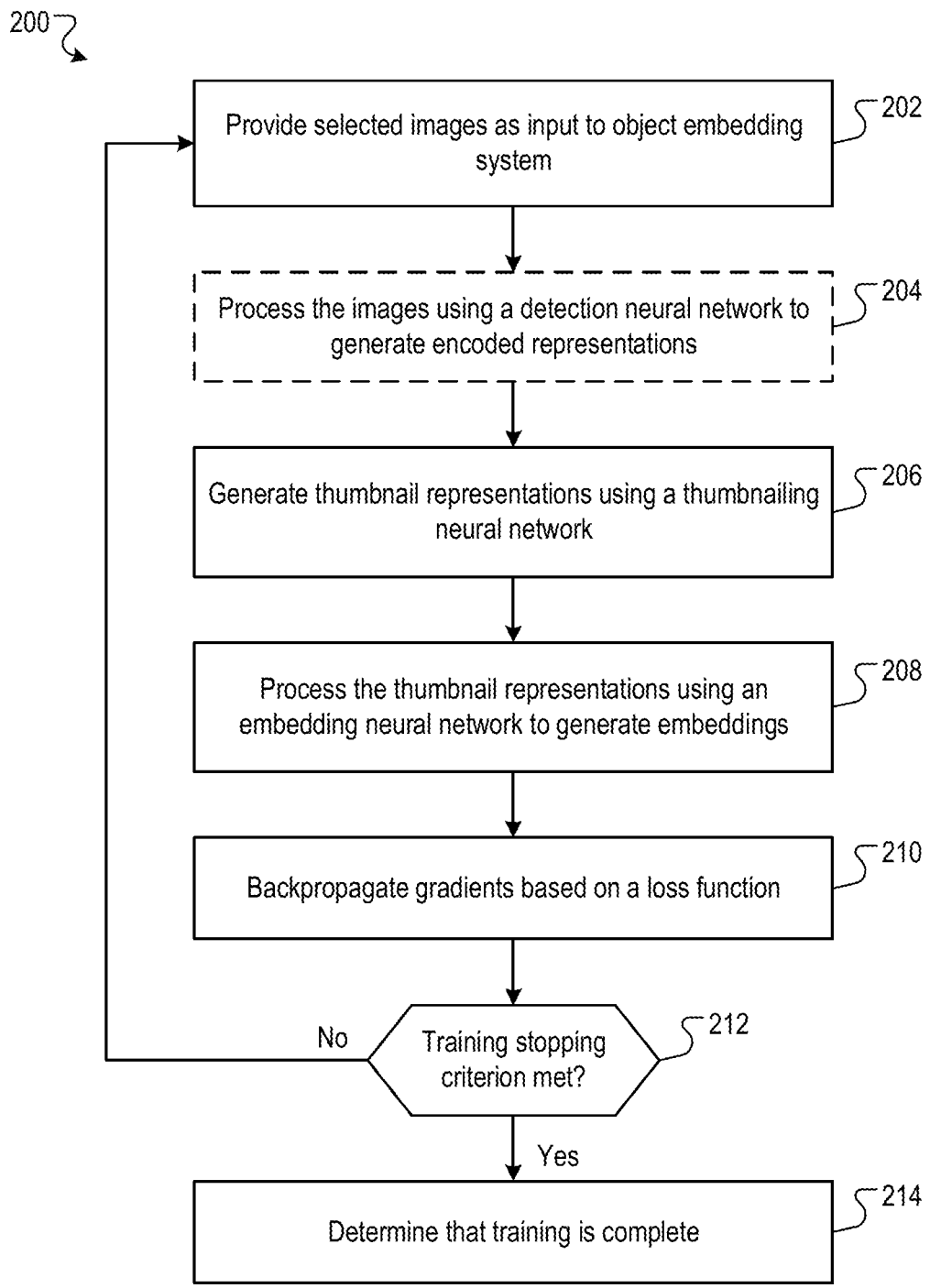
FIG. 2 is a flow diagram of an example process for training an object embedding system.

FIG. 2 is a flow diagram of an example process for training an object embedding system. For convenience, the process 200 will be described as being performed by a system of one or more computers located in one or more locations. For example, an object embedding system, e.g., the object embedding system 100 of FIG. 1, appropriately programmed in accordance with this specification, can perform the process 200.

One or more images are selected from a set of training images and provided as input to the system (202). In some cases, the one or more images are selected randomly from the set of training images. Each of the images depicts one or more instances of an object of the particular type. For example, the particular type of object may be human faces or full human bodies. The set of training images is associated with data indicating the identities of the objects of the particular type depicted in the training images. For example, if the particular type of object is human faces, the training images may be annotated with labels indicating the identities of the faces depicted in the training images. In some implementations, the training images are also associated with data indicating the positions of key points of the objects of the particular type depicted in the training images. For example, the key points of an object may include the vertices of a bounding box that encloses the object. As another example, the key points of an object may include features in the object. If the particular type of object is human faces, features in the object may include anatomical features such as the ears, eyes, or mouth.

In some implementations, each of the images are provided as input to a detection neural network that is configured to process each of the images in accordance with values of a set of detection neural network parameters to generate as output an encoded representation of each of the images (204). In some implementations, the values of the set of detection neural network parameters are pre-trained to generate encoded representations of images including data identifying predicted locations of objects of the particular type depicted in the images. Data identifying predicted locations of objects of the particular type may include, for example, the coordinates of bounding boxes and corresponding probabilities that the bounding boxes contain objects of the particular type. In these implementations, pre-training the detection neural network may involve optimizing the values of the set of detection neural network parameters to cause the detection neural network to generate more accurate predictions of the locations of objects of the particular type depicted in images, based on a set of images where the object locations are known. In some implementations, the encoded representation of an image generated by the detection neural network includes one or more intermediate outputs of the detection neural network.

For each image, the thumbnailing network generates a corresponding thumbnail representation of one or more instances of objects of the particular type depicted in the image (206). In some implementations, the thumbnailing neural network is configured receive as input encoded image representations generated by the detection neural network. The thumbnailing neural network generates the thumbnail representation of the object by determining parameters of a spatial transformation and applying the determined spatial transformation to the image. The spatial transformation may specify a correspondence between each pixel of the thumbnail representation and a corresponding pixel of the image. In some implementations, the spatial transformation includes an affine transformation that associates pixels of the thumbnail representation with corresponding pixels of the image based on transformation operations such as translation and scaling. In some implementations, the spatial transformation includes a warping transformation that associates pixels of the thumbnail representation with corresponding pixels of the image based on displacement vectors associated with each pixel of the thumbnail representation. In some implementations, the spatial transformation is a composition of an affine transformation followed by a warping transformation, where the affine transformation approximately localizes the object in the image, and the warping transformation fine-tunes the localization and alignment of the object in the image.

The system provides the thumbnail representations generated for each image to an embedding neural network that is configured to process a thumbnail representation in accordance with values of a set of embedding neural network parameters to generate as output an embedding of the object depicted in the thumbnail representation (208). In some implementations, the embedding neural network is pre-trained based on a set of thumbnail representations depicting objects of the particular type that are not generated by the thumbnailing neural network. For example, the set of thumbnail representations depicting objects of the particular type may be generated by manual annotation. In these implementations, the embedding neural network may be pre-trained based on a loss function to reduce the distance between embeddings generated by the embedding neural network of same instances of objects and to increase the distance between embeddings generated by the embedding neural network of different instances of objects. For example, the thumbnailing neural network may be pre-trained based on a triplet loss function.

The training engine backpropagates gradients based on a loss function to adjust the parameters of one or more of the embedding neural network, the thumbnailing neural network, and the detection neural network (210). In particular, the loss function includes a task loss term to reduce the distance between embeddings generated by the system for same instances of objects and to increase the distance between embeddings generated by the system for different instances of objects. The distance between embeddings can be determined in accordance with any appropriate distance measure, such as the Euclidean distance. In some implementations, the task loss term is a triplet loss term. In some other implementations, the task loss term is a distillation loss that requires the embedding generated by the embedding network for a particular thumbnail representation to be similar to the embedding generated by a different embedding network (referred to in this specification as a master embedding network) for the particular thumbnail representation. In general, the master embedding network is itself trained to reduce the distance between embeddings generated by the master embedding network for same instances of objects of the particular type and to increase the distance between embeddings generated by the master embedding network for different instances of objects of the particular type. Using a distillation loss for the task loss term may cause the parameters of the system to converge rapidly during training, thereby facilitating efficient system prototyping to explore, for example, different system architectures.

In some implementations, the loss function includes an additional localization term enforcing that the thumbnailing neural network accurately localizes objects of the particular type in images. For a training image processed by the system, the localization term may be evaluated by determining key points of the thumbnail representation of the object of the particular type depicted in the image, determining the coordinates of the key points of the thumbnail representation in the frame of reference of the image, and determining an error measure between the key points of the object depicted in the image (which are known for training images) and the corresponding key points of the thumbnail representation in the frame of reference of the image. For example, the error measure may be determined as a sum of errors (e.g., Euclidean distances) between the key points of the object depicted in the image and the corresponding key points of the thumbnail representation in the frame of reference of the image.

In some cases, the key points of the object depicted in the image may include the vertices of a bounding box that encloses the object, and the corresponding key points of the thumbnail representation may be the bounding vertices of the thumbnail representation. In some cases, the key points of the object depicted in the image may include features in the object and the corresponding key points of the thumbnail representation may be the features of the object as depicted in the thumbnail representation. The coordinates of the key points of the thumbnail representation in the frame of reference of the image are determined by transforming the coordinates of the key points of the thumbnail representation in accordance with the parameters of the spatial transformation of the thumbnailing neural network determined for the thumbnail representation. For example, if the spatial transformation is composition of an affine transformation followed by a warping transformation, then the coordinates of the key points of the thumbnail representation in the frame of reference of the image are determined by applying the affine transformation followed by the warping transformation to the coordinates of the key points of the thumbnail representation.

In some implementations, the localization term of the loss function incorporates a tolerance radius. For example, as previously described, the localization term may be determined as a sum of errors between the key points of the object depicted in the image and the corresponding key points of the thumbnail representation in the frame of reference of the image. The error between a key point of the object depicted in the image and a corresponding key point of the thumbnail representation may be determined as zero if a distance between them is less than the tolerance radius. For example, the localization term of the loss function may be given by:

$$\frac{1}{L}\sum_{i=1}^{L} \max(dist(p_i, p'_i) - \text{tolerance\_radius}, 0),$$

where L is the number of images processed by the system in the training iteration, $\{p_i\}_i^L=1$ are the key points of the object depicted in the image, $\{p'_i\}_i^L=1$ are the key points of the thumbnail representation in the frame of reference of the input image, and dist(.,.) is an arbitrary distance measuring function. For example, dist(.,.) could be a Euclidean distance or a smooth L1 distance. In general, the tolerance radius is a non-negative number. Including a localization term with a non-zero tolerance radius in the loss function causes the thumbnailing neural network to generate thumbnail representations that reasonably localize objects of the particular type in images, but allows the thumbnailing neural network to generate thumbnail representations that deviate from exact localization of objects of the particular type in images where necessary to generate better thumbnail representations (e.g., that can be processed by the embedding neural network to generate more useful embeddings). In some implementations, the tolerance radius is gradually increased over a series of training iterations until it reaches a maximum threshold.

The training engine determines whether a stopping criterion indicating that the training of the system is complete has been met (212). In some implementations, the stopping criterion may be that the system has been trained for a pre-determined number of training iterations. In some implementations, the stopping criterion may be that the loss function converges (e.g., that the change in value of the loss function between training iterations falls below a pre-determined threshold). In some implementations, the stopping criterion may be that an object recognition system using the embeddings generated by the system reaches a pre-determined threshold accuracy. In some implementations, the stopping criterion may be a combination of one or more of the previously discussed stopping criteria. In response to determining that the stopping criterion has been met, the training engine determines that the training is complete (214). In response to determining that the stopping criterion has not been met, the training engine returns to 202 and repeats the preceding operations.

Figure 3:
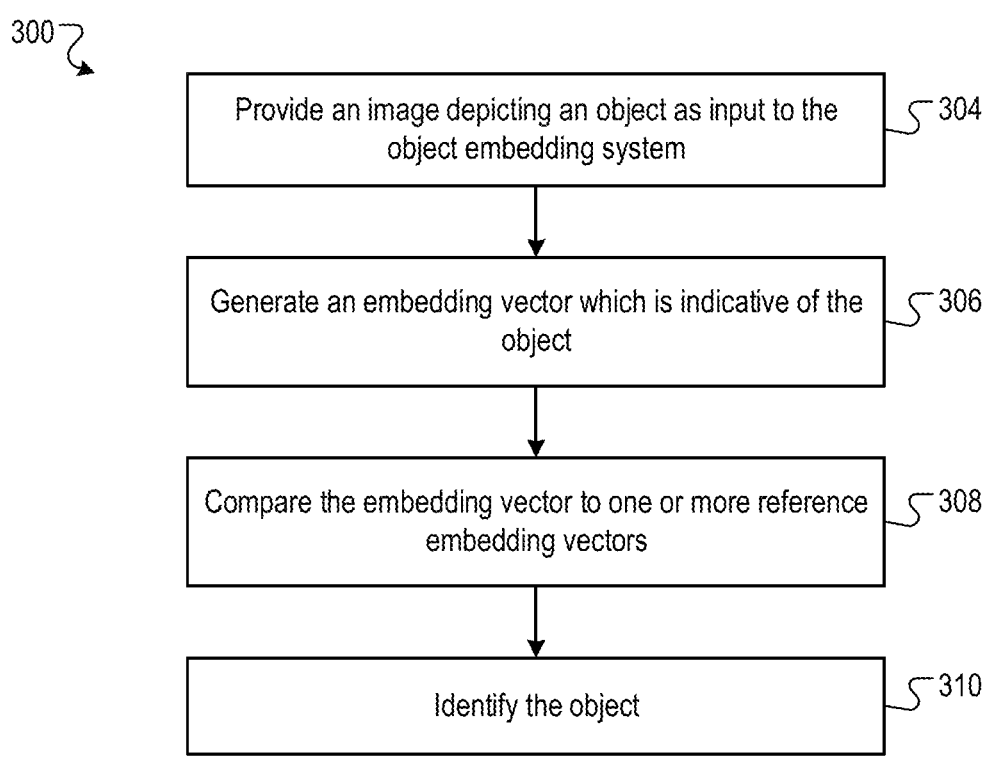
FIG. 3 is a flow diagram of an example process for identifying objects using an object identification system.

FIG. 3 is a flow diagram of an example process for identifying objects using an object identification system. For convenience, the process 300 will be described as being performed by a system of one or more computers located in one or more locations. For example, an object identification system, e.g., the object identification system 120 of FIG. 1, appropriately programmed in accordance with this specification, can perform the process 300.

The object identification system provides an image depicting an object of a particular type to be identified as input to an object embedding system (e.g., the object embedding system 100 of FIG. 1) that has been trained to generate embeddings of objects of the particular type, for example, based on process 200 of FIG. 2 (304). In some implementations, the particular type of object is a face.

The object embedding system generates an embedding for the object depicted in the image (306). For example, the object embedding system generates the embedding 114 as described above. In some cases, the embedding is represented as a vector.

The object identification system compares the generated embedding to a set of one or more reference embeddings (308). Comparing the generated embedding to a set of one or more reference embeddings may include determining a distance (e.g., a Euclidean distance) between the generated embedding and each reference embedding of the set of reference embeddings. Each of the reference embeddings may be associated with an object identity. For example, each of the reference embeddings may be associated with an identity of a face.

The object identification system identifies the object depicted in the image (310). In some implementations, the object identification system identifies the object by determining that the embedding of the object is closest to a particular reference embedding and therefore that the object has the identity associated with the particular reference embedding. For example, the object identification system may be a facial identification system that identifies faces depicted in images.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for generating an embedding of an object depicted in an input image, the method comprising:
processing an input derived from the input image using a thumbnailing neural network, in accordance with current values of thumbnailing neural network parameters, to generate a thumbnail image of the object depicted in the input image, comprising:
determining, in accordance with the current values of the thumbnailing neural network parameters, values of parameters of a spatial transformation that defines a correspondence between pixels of the thumbnail representation and pixels of the input image; and
generating the thumbnail image by applying the spatial transformation to the input image; and
processing the thumbnail image using an embedding neural network to generate the embedding of the object depicted in the input image;
wherein the thumbnailing neural network and the embedding neural network have been jointly trained to increase a distance between embeddings of different objects and to decrease a distance between embeddings of same objects.

2. The method of claim 1, wherein the embedding of the object depicted in the input image comprises an embedding vector.

3. The method of claim 1, wherein the object depicted in the input image comprises a human face.

4. The method of claim 3, further comprising using the embedding of the object depicted in the input image to perform facial identification.

5. The method of claim 1, wherein the object depicted in the input image comprises a full human body.

6. The method of claim 1, wherein the input image is received by a personal digital assistant, and the embedding of the object depicted in the input image is provided for use by the personal digital assistant.

7. The method of claim 1, wherein the input image is received by a mobile telephone, and the embedding of the object depicted in the input image is provided for use by the mobile telephone.

8. The method of claim 1, further comprising:
processing the input image using a detection neural network to generate an encoded representation of the input image;
wherein the input processed by the thumbnailing neural network comprises the encoded representation of the input image generated by the detection neural network.

9. The method of claim 8, wherein the encoded representation of the input image comprises data identifying a predicted location, in the input image, of the object depicted in the input image.

10. The method of claim 1, wherein the spatial transformation of the thumbnailing neural network comprises an image warping spatial transformation that defines a correspondence between the pixels of the thumbnail image and the pixels of the input image according to a respective displacement vector corresponding to each pixel of the thumbnail image.

11. The method of claim 10, wherein the spatial transformation of the thumbnailing neural network comprises a composition of an affine spatial transformation and the image warping spatial transformation.

12. A system comprising:
one or more computers; and
one or more storage devices communicatively coupled to the one or more computers, wherein the one or more storage devices store instructions that, when executed by the one or more computers, cause the one or more computers to perform operations for generating an embedding of an object depicted in an input image, the operations comprising:
processing an input derived from the input image using a thumbnailing neural network, in accordance with current values of thumbnailing neural network parameters, to generate a thumbnail image of the object depicted in the input image, comprising:
determining, in accordance with the current values of the thumbnailing neural network parameters, values of parameters of a spatial transformation that defines a correspondence between pixels of the thumbnail representation and pixels of the input image; and
generating the thumbnail image by applying the spatial transformation to the input image; and
processing the thumbnail image using an embedding neural network to generate the embedding of the object depicted in the input image;
wherein the thumbnailing neural network and the embedding neural network have been jointly trained to increase a distance between embeddings of different objects and to decrease a distance between embeddings of same objects.

13. The system of claim 12, wherein the embedding of the object depicted in the input image comprises an embedding vector.

14. The system of claim 12, wherein the object depicted in the input image comprises a human face.

15. The system of claim 14, further comprising using the embedding of the object depicted in the input image to perform facial identification.

16. The system of claim 12, wherein the object depicted in the input image comprises a full human body.

17. The system of claim 12, wherein the input image is received by a personal digital assistant, and the embedding of the object depicted in the input image is provided for use by the personal digital assistant.

18. The system of claim 12, wherein the input image is received by a mobile telephone, and the embedding of the object depicted in the input image is provided for use by the mobile telephone.

19. The system of claim 12, wherein the operations further comprise:
   processing the input image using a detection neural network to generate an encoded representation of the input image;
   wherein the input processed by the thumbnailing neural network comprises the encoded representation of the input image generated by the detection neural network.

20. One or more non-transitory computer storage media storing instructions that when executed by one or more computers cause the one or more computers to perform operations for generating an embedding of an object depicted in an input image, the operations comprising:
   processing an input derived from the input image using a thumbnailing neural network, in accordance with current values of thumbnailing neural network parameters, to generate a thumbnail image of the object depicted in the input image, comprising:
      determining, in accordance with the current values of the thumbnailing neural network parameters, values of parameters of a spatial transformation that defines a correspondence between pixels of the thumbnail representation and pixels of the input image; and
      generating the thumbnail image by applying the spatial transformation to the input image; and
   processing the thumbnail image using an embedding neural network to generate the embedding of the object depicted in the input image;
wherein the thumbnailing neural network and the embedding neural network have been jointly trained to increase a distance between embeddings of different objects and to decrease a distance between embeddings of same objects.

* * * * *